(12) United States Patent
Rodriguez et al.

(10) Patent No.: US 7,107,315 B1
(45) Date of Patent: Sep. 12, 2006

(54) METHOD FOR WEB-BASED DELIVERY OF USE-RESTRICTED PROGRAMS TO HANDLE MAIL ATTACHMENTS

(75) Inventors: Herman Rodriguez, Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,183

(22) Filed: Apr. 27, 2000

(51) Int. Cl.
 *G06F 15/16* (2006.01)
 *G06F 9/44* (2006.01)
 *G06F 9/445* (2006.01)

(52) U.S. Cl. .................. 709/206; 717/178; 717/173
(58) Field of Classification Search ............ 709/203, 709/216, 229, 206, 207; 705/51, 52; 717/174, 717/176; 719/310, 311, 312, 318
See application file for complete search history.

(56) References Cited

U.S. PATENT DOCUMENTS

| | | | | |
|---|---|---|---|---|
| 5,715,403 A * | 2/1998 | Stefik | .................. | 709/229 |
| 5,790,793 A * | 8/1998 | Higley | .................. | 709/218 |
| 6,347,398 B1 * | 2/2002 | Parthasarathy et al. | ..... | 717/178 |
| 6,405,362 B1 * | 6/2002 | Shih et al. | .................. | 717/174 |
| 6,453,340 B1 * | 9/2002 | Emura | .................. | 709/206 |
| 6,618,747 B1 * | 9/2003 | Flynn et al. | ............... | 709/206 |
| 6,651,087 B1 * | 11/2003 | Dennis | .................. | 709/206 |
| 2002/0161709 A1 * | 10/2002 | Floyd et al. | ................ | 705/51 |

FOREIGN PATENT DOCUMENTS

WO WO 03/005654 A1 * 1/2003

* cited by examiner

*Primary Examiner*—Larry D. Donaghue
(74) *Attorney, Agent, or Firm*—Duke W. Yee; Jeffrey S. LaBaw; Cathrine K. Kinslow

(57) ABSTRACT

An e-mail server is configured so that when an e-mail having an attachment is received at the server, a web-based URL is included in the e-mail to identify a fulfillment site at which a handler (e.g., a plug-in) for the attachment may be obtained. The e-mail is delivered to a client machine. When the user of the machine selects the attachment to open, the e-mail application checks to determine if there is a registered handler in the client machine to handle the attachment. If there is no installed attachment handler (or if the handler is not available), the e-mail application automatically contacts the fulfillment site by opening a browser (or other viewer) to the URL that was included with the e-mail. When the user enters the required data, the fulfillment site sends the attachment handler. Upon receipt, the plug-in self-installs and opens the attachment in a seamless manner.

21 Claims, 3 Drawing Sheets

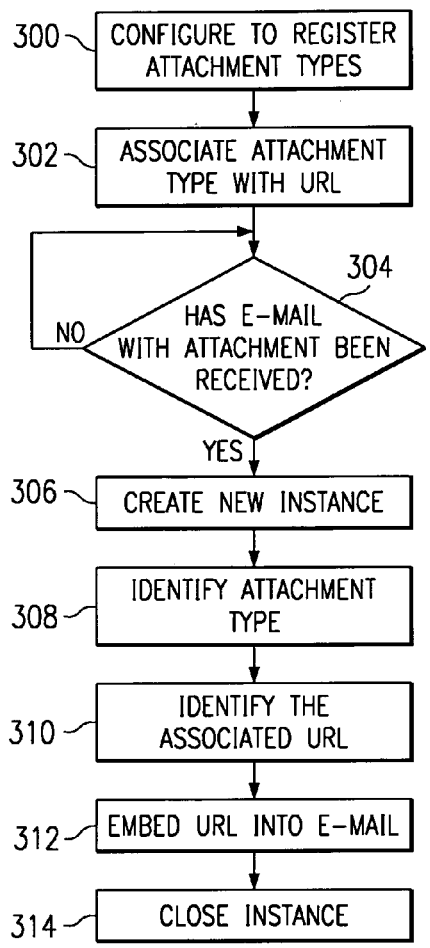
FIG. 3
| ATTACHMENT TYPE | URL |
|---|---|
| .ppt (PowerPoint) | www.microsoft.com/pp.... |
| .pdf (Acrobat) | www.adobe.com/... |
| ... | ... |
| ... | ... |
FIG. 4
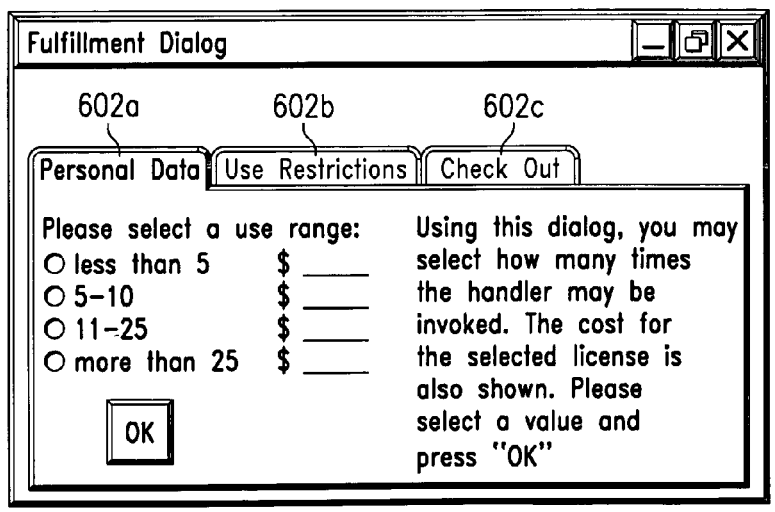
FIG. 6

METHOD FOR WEB-BASED DELIVERY OF USE-RESTRICTED PROGRAMS TO HANDLE MAIL ATTACHMENTS

BACKGROUND OF THE INVENTION

1. Technical Field

This invention relates generally to information delivery in a computer network. More particularly, the invention relates to techniques for enabling a user of an e-mail client to obtain programs for handling mail attachments.

2. Description of the Related Art

E-mail has become the communication method of choice throughout the business world as well as for the general public. In a typical enterprise environment, a mail server (such as UNIX SendMail) has a local mail delivery agent or client (typically .../bin/mail on UNIX systems) that stores an incoming e-mail on a local file system and delivers it to an end user via POP, IMAP or a command line program. Such agents typically provide the basic functionality of logging in an e-mail message and copying that message to a client machine's mail spool. Internet-based client-server messaging systems include, for example, Lotus Notes, which provides e-mail, calendaring, group scheduling, Web access and information management, integrated in an easy-to-use and customizable environment.

When a user receives a file attachment via e-mail, it is often the case that there is no installed application (generically, a "handler") to handle the attachment. For example, assume that an e-mail includes a Microsoft PowerPoint presentation as a file attachment. Certain e-mail applications (such as a Lotus Notes client) include third party presentation software, e.g., Freelance, that cannot be used to display a PowerPoint presentation. The user must then attempt to locate the handler and, if successful, download and install the program on his or her machine. This is a difficult and often frustrating set of tasks, especially if the user only needs the program for a single use or if the user already has a copy of the program on some other machine. To address this problem, it is known in the art to have a client browser (e.g., Netscape Navigator) open to a default "plug-in" page to assist the user. Nevertheless, even in this situation, the user must manually locate the relevant plug-in, download it, and then install it before the e-mail attachment can be accessed.

It would be desirable to provide a more automated method to seamlessly install and enable attachment handlers in an e-mail client. The present invention addresses this problem.

BRIEF SUMMARY OF THE INVENTION

An e-mail server is configured so that when an e-mail having an attachment is received at the server, a web-based URL is included in the e-mail to identify a fulfillment site at which a handler (e.g., a plug-in) for the attachment may be obtained. The e-mail is delivered to a client machine having an e-mail application such as Lotus, Microsoft Outlook, or the like. When the user of the machine selects the attachment to open, the e-mail application checks to determine if there is a registered handler in the client machine to handle the attachment. If there is no installed attachment handler (or if the handler is not available), then the e-mail application automatically contacts the fulfillment site by opening a browser (or other viewer) to the URL that was included with the e-mail. Preferably, the fulfillment site returns a fulfillment page that may take the form of a dialog or fill-in form. The form may request billing and subscription data. When the user enters the required data, the fulfillment site sends the attachment handler, which is preferably a self-installing plug-in. Upon receipt, the plug-in self-installs and opens the attachment in a seamless manner.

In an illustrative embodiment, the fulfillment site makes the handler available to the user of the client machine for a prescribed number of times or for a limited period of time. When the use rights expire, the handler automatically removes itself from the client machine. Thus, in a representative example, the user subscribes to use the handler for a given number of times. This use restriction may be enforced by associating an encrypted usage count with the handler when the handler is first delivered to the client machine. Upon each invocation of the handler at the client machine, the usage count is decremented. When the count reaches zero, the handler uninstalls itself.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a flowchart illustrating an e-mail server control routine according to the present invention;

FIG. 4 is a simplified data structure illustrating a URL lookup table that is maintained in the e-mail server;

FIG. 6 is a simplified diagram of a representative dialog that may be used to identify usage terms for a given handler.

DETAILED DESCRIPTION OF THE PREFERRED EMBODIMENT

Figure 1:
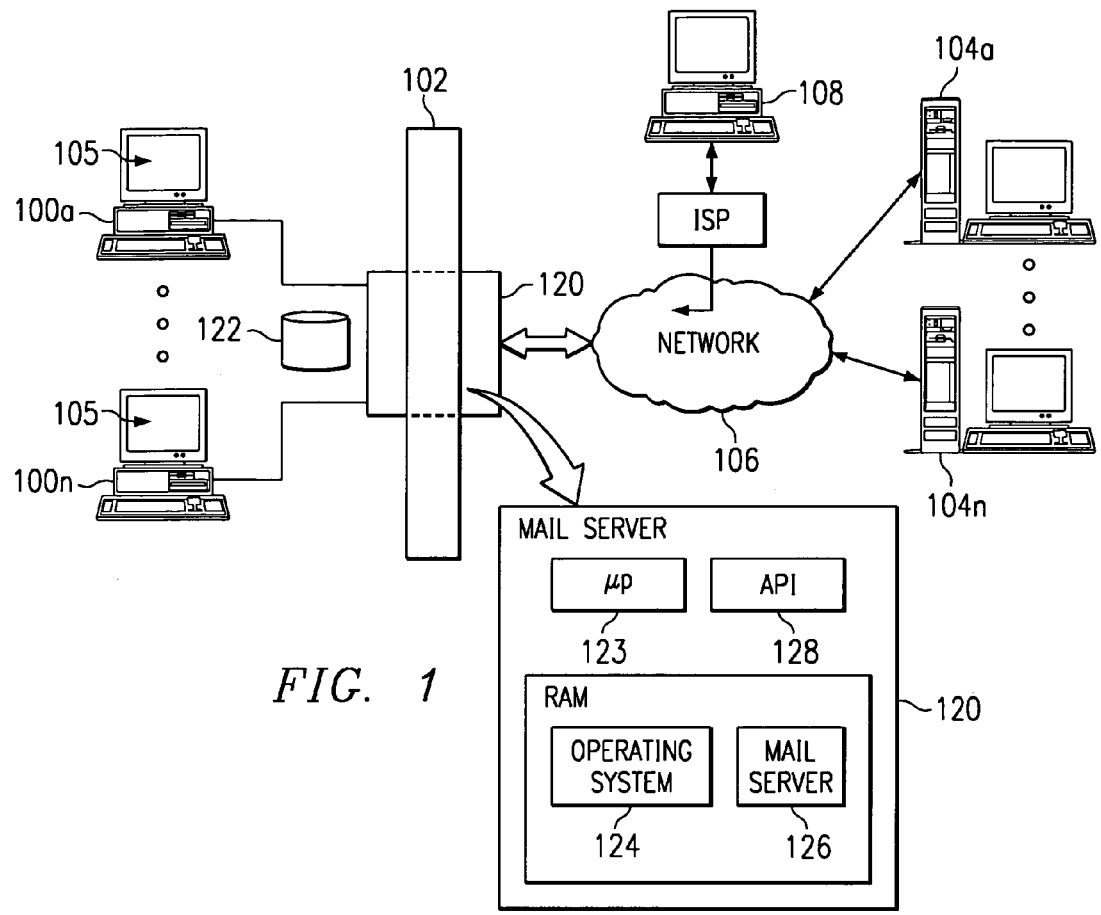
FIG. 1 is a representative SMTP-based client-server system in which the present invention is implemented.

By way of background, a known Internet client-server system is implemented and illustrated in FIG. 1. In this system, a set of client machines 100a–100n are connected behind a network firewall 102 within an enterprise environment. Each client machine has the capability of connecting to a set of web servers 104a–104n over network 106 in a known manner. Network 106 typically includes other servers for control of domain name resolution, routing and other control functions. The network 106 is the Internet, an Intranet, or any other known network. To this end, each client typically includes a suite of programs that enable a user of the client to obtain known Internet services including one-to-one messaging (e-mail), one-to-many messaging (bulletin board), file transfer, and web browsing. Thus, a user of client 108 outside the firewall 102 may communicate with one of the clients 100 inside the firewall. A representative client includes a Simple Mail Transport Protocol (SMTP) e-mail client 105 such as Lotus Notes, Microsoft Outlook, or the like. E-mail clients 105 cooperate with mail server 120 in a known manner. A representative mail server 120 includes a local mail delivery agent that stores incoming e-mail on a local file system 122 and delivers it to an end user (e.g., via POP, IMAP or a command line program). In the Internet paradigm, a network path to a resource (e.g., a server) is identified by a so-called Uniform Resource Locator (URL).

A representative mail server 120 is an IBM Domino server comprising a processor 123, an operating system 124 and a mail server program 126. Mail server program is a local mail delivery agent, as previously noted. The server 120 may include an Application Programming Interface (API) 128 that provides extensions to enable application developers to extend and/or customize the core functionality thereof through software programs including plug-ins, servlets, and the like.

A representative client is a personal computer, notebook computer, Internet appliance or pervasive computing device (e.g., a PDA or palm computer) that is x86-, Pentium-PowerPC®- or RISC-based. The client includes an operating system such as IBM® OS/2®, Microsoft Windows, Microsoft Windows NT, Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications. The client also includes an e-mail client, such as Lotus Notes, Microsoft Outlook, or the like, to manage e-mail communications.

Existing e-mail clients have the capability of receiving attachments having a mime type or other proprietary file type extension. According to the present invention, an e-mail client is modified to include additional functionality that enables the user to readily obtain and install any handler that is required to view or otherwise process the file attachment in a seamless manner. As used herein, a "handler" is any program, process, code, application or software that is useful in opening and/or processing a file attachment. As will be described in more detail, when an e-mail having an attachment is delivered to the e-mail client, it preferably includes an embedded link (e.g., a URL) to a server at which a handler for the attachment may be obtained. The user simply clicks or otherwise selects the mail attachment in the usual manner. Upon this selection, the e-mail client determines whether a handler is required and, if so, whether the requisite handler exists on the client machine. If not, the e-mail client opens a connection using HTTP (or some Internet protocol) to the URL identified by the embedded link. In a preferred embodiment, the URL identifies a fulfillment site at which the user may obtain the required handler. Preferably, the fulfillment site issues various kinds of use licenses. Thus, for example, the fulfillment site may issue a view-only license under which the handler may be downloaded and used only for viewing the attachment. The fulfillment center, alternatively, may issue a license to use the handler for a given time period, or for a given number of program invocations.

Figure 2:
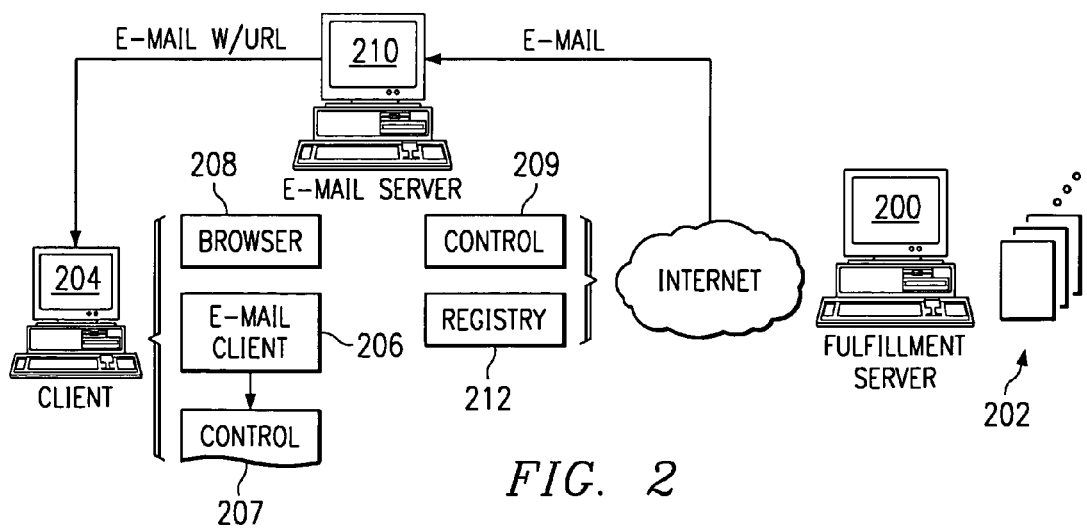
FIG. 2 is a block diagram illustrating the main components of the e-mail attachment handler distribution system of the present invention.

FIG. 2 illustrates the three (3) basic components of the e-mail attachment handler distribution system of the present invention. The system comprises a server 200 which serves as a fulfillment site for hosting a set of one or more attachment handlers 202. While server 200 is illustrated as a single server, one of ordinary skill in the art will appreciate that multiple servers may be used for this purpose. Thus, for example, a first handler type may be hosted at a first server, a second handler type may be hosted at a second server, and so on. A local client system 204 includes an e-mail client 206 that has been provisioned by client control routine 207 to provide the inventive functionality. Local client system 204 also includes a graphics viewer engine, such as a web browser 208. An e-mail server 210 includes an e-mail server control routine 209 that is the third component of the system. E-mail server 210 preferably is located within an enterprise firewall as illustrated in FIG. 1, although this is not a requirement of the present invention. E-mail server 210 also includes a registry 212 that includes URL data identifying the server, e.g., server 200, from which the attachment handlers can be selectively retrieved as will be described. Server 200 may provide the URL data to the registry 212, or the registry may obtain it from the server 200 or from some other source.

In operation, a user or system administrator of the e-mail server 210 provisions the server (via control routine 209) to attach a URL to any e-mail message having an attachment that is received by the e-mail server for delivery to an e-mail client within the enterprise. The URL identifies the server from which a user of the local client system can retrieve a handler for the attachment if necessary. When the e-mail message (together with the attachment) is then received at the e-mail client 206 that has been provisioned with the client control routine 207, the user of the local client system has the capability of automatically retrieving the handler.

In particular, when the user selects the attachment, the client control routine determines whether the local client system has the handler installed. If not, the client control routine 207 opens the browser window to the URL located in the e-mail message. At this point in the operation, the client browser communicates with the fulfillment site. In particular, the client browser preferably retrieves a fulfillment dialog or page that is displayed on the user's machine. The user is prompted to fill-in given identifying information, e.g., user identification, billing data, subscription data, or the like. Upon completion of the fulfillment dialog, the server 200 sends to the client the attachment handler, preferably in the form of a self-extracting file that automatically installs itself on the local client system. The attachment handler, once installed, opens the attachment in the usual manner.

Thus, according to the present invention, when a user of an e-mail client attempts to open an attachment (e.g., by clicking on it), a determination is first made whether the local client system supports an appropriate handler for the attachment. If not, a browser window is automatically opened to a fulfillment site from which the handler can be obtained. The user may then provide information within a fulfillment dialog to obtain the handler, which preferably is then downloaded as a self-extracting file that installs itself on the user's computer.

One of ordinary skill in the art will appreciate that fulfillment site need not support the handler directly. This site may simply act as a clearinghouse for one or more third party servers that actually support the handler programs. Moreover, it is not required to perform a fulfillment dialog between the user and the fulfillment site under certain circumstances. Thus, for example, a user may pre-register with the fulfillment site so that the required handler (as identified by a given URL) may be automatically downloaded to the requesting client machine whenever the user (at the local client) selects an attachment of a type that is unsupported on the client machine. Alternatively, if the fulfillment site does not charge for the handler or the handler is freeware, the fulfillment dialog can be omitted so that the software plug-in is downloaded to the local client system directly without the fulfillment dialog.

In a preferred embodiment, however, the fulfillment dialog is used. One particular advantage of using the fulfillment dialog is that one or more use restrictions may be imposed on the user of the attachment handler. Thus, for example, the fulfillment site operator may desire to restrict the local client system user to a given number of invocations of the attachment handler. Alternatively, the fulfillment site operator may restrict the local client system user to use the handler for the attachment only over a given, limited time period. Yet another alternative is to restrict the type of use that may be made of the handler. Thus, for example, the user may only obtain a version of the handler that allows the attachment to be viewed but not edited, or viewed but not printed, or the like. Using the fulfillment dialog, the user can be required to input one or more selections to identify such use options or restrictions. As described above, a user of a local client system may pre-register his or her selections to reduce the time necessary to receive the actual download when the handler is required to open a particular attachment type. Alternatively, the URL may be embedded with the attachment when the attachment is created.

FIG. 3 is a flowchart illustrating the operation of the control routine 209 of the e-mail server 210. The control routine 209 may be implemented as a Java servlet or as a standalone application. As described above, e-mail server 210 has a registry 212 associated therewith. Registry 212 is a database or other convenient data structure, such as a lookup table. The routine begins at step 300 with a user or system administrator configuring the e-mail server to register attachment types. An attachment type is associated with a Uniform Resource Locator (URL). Thus, in step 302, an attachment type is associated with a URL by storing the type and URL in the lookup table. A representative lookup table 400 is illustrated in FIG. 4. The control routine then continues at step 304 by testing whether an e-mail message having an attachment has been received by the e-mail server (e.g., from over the Internet) and queued for delivery to an e-mail client. If so, the control program spawns an instance of itself at step 306. At step 308, the control program instance identifies the attachment type. The routine then uses the type to access the lookup table and identify the associated URL. This is step 310. At step 312, the routine embeds the URL in the e-mail to be delivered to the local client system. The instance then closes itself at 314 to complete the process. Thus, when the e-mail message is served to its intended recipient, the message includes the attachment together with an embedded URL identifying the location of a site from which a handler for that attachment may be retrieved.

Figure 5:
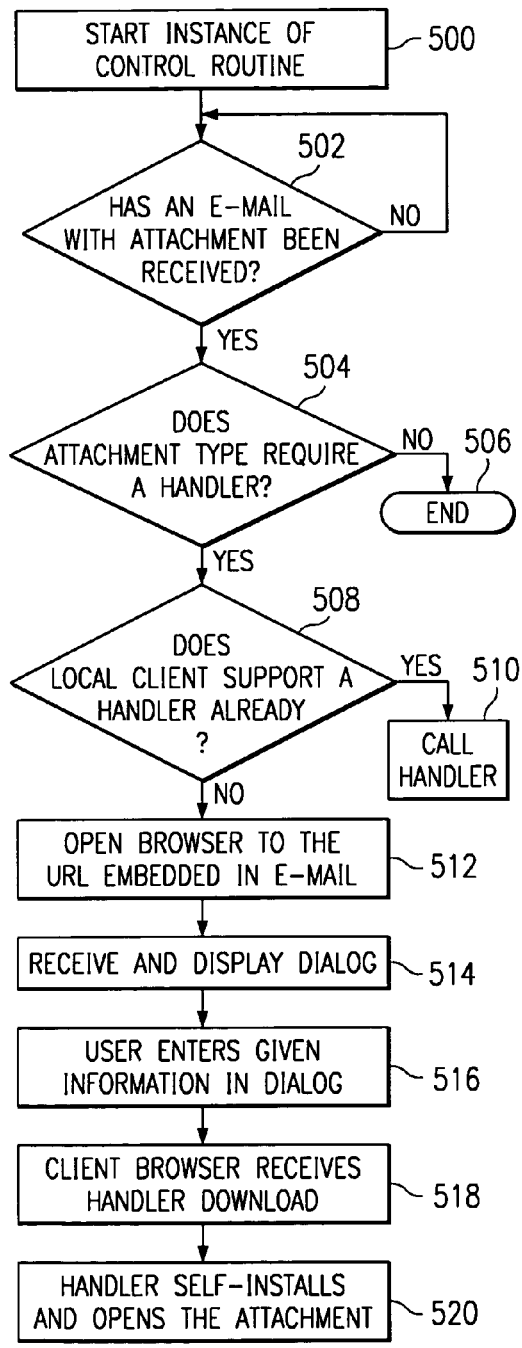
FIG. 5 is a flowchart illustrating a client control routine of the present invention.

FIG. 5 illustrates the preferred operation of the client control routine 207. An instance of this routine is spawned at step 500 whenever the e-mail client is started. The routine then cycles at step 502 testing for receipt of an e-mail having an attachment. If the outcome of the test at step 502 is positive, the routine continues at step 504 to test whether the attachment type requires a handler. If not, the routine branches to step 506 and ends. If, however, the outcome of the test at step 504 indicates that a handler is required, the routine continues at step 508 to test whether the local client system supports a handler for the attachment type. If so, the routine branches to step 510 and calls the handler to process the attachment in the usual manner. If, however, the outcome of the test at step 508 is negative, the routine continues at step 512 to open an instance of a browser window (or other graphics viewer software) to the URL embedded in the e-mail message. As noted above, the URL preferably was embedded in the e-mail message by operation of the e-mail server routine. In an alternative embodiment, the URL may be identified from a lookup table (like table 400 in FIG. 4) that is resident on or otherwise accessible from, the local client system. An alternative method, as described above, involves embedding the URL with the attachment.

The client routine then continues at step 514. At this point, the following functions are effected from the client browser interacting with a fulfillment site server. In particular, at step 514, the browser software receives and displays a dialog panel. This panel may be served to the local client system browser as a web page, a web servlet, or other fill-in form such as a Common Gateway Interface (CGI) form. A representative dialog panel 600 is shown in FIG. 6 and will be described below. At step 516, the user enters given information into the form, e.g., a user name, e-mail address, subscription information, billing information, and the like. At step 518, e.g., upon completion of a subscription, the client browser receives a download of the handler. At step 520, the handler preferably self-installs and opens the attachment. This completes the process.

Figure 7:
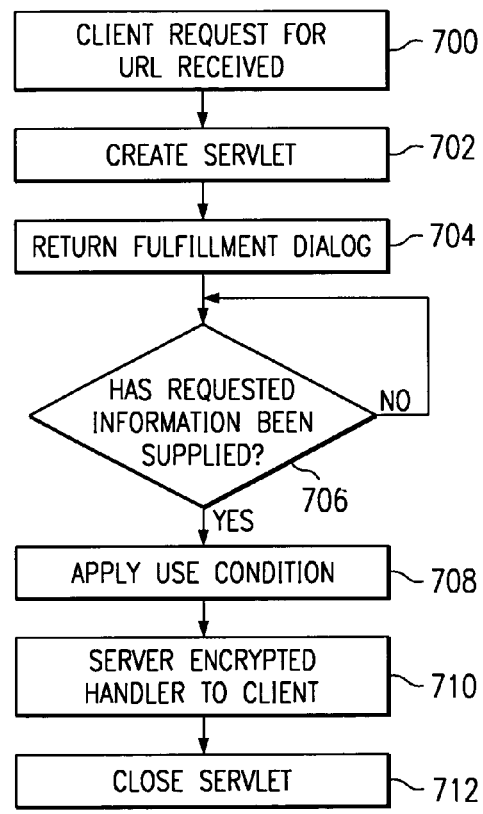
FIG. 7 is a flowchart illustrating the preferred operation of a fulfillment site according to the present invention.

FIG. 7 illustrates a flowchart of the operation of the fulfillment server. The server preferably supports known server technologies such as dynamically generated HTML, i.e. database or CGI scripts used to generate a web page on the fly, Sun Microsystems's Java Server Page (JSP), Microsoft's Active Server Page (ASP), the Extensible Style Sheet Language (XSL/XSLT) being promoted by the World Wide Web Consortium (W3C), or the like. JSP, ASP and XSL/XSLT provide for the generation and serving of dynamic web page content by enabling a page creator to write HTML and then to embed pure programming logic inside the page markup. The fulfillment server operates in the open Internet environment or over an intranet and, thus, the communications between the local client system browser and the server constitute a conventional stateless Internet transaction over an HTTP connection, which is preferably a secure SSL connection.

The routine begins at step 700 when a client request for the URL is received at the server. At step 702, a servlet is spawned to handle the client request. At step 704, the routine returns the fulfillment dialog page as described above. The routine then tests at step 706 to determine whether the requested information has been supplied. If not, the routine cycles or returns an error message. When the outcome of the test at step 706 indicates that the fulfillment dialog is complete, the routine continues at step 708 to apply a given use condition to the handler requested by the client. Thus, for example, the step of applying the use condition may encrypt the handler with a use count. Each time the handler is invoked on the local client system, the use count (which remains encrypted) is decremented. If the use count reaches a low count threshold, the fulfillment dialog may then warn the user that only a few uses remain and may offer the option to purchase additional uses. When the use count reaches zero, the handler uninstalls itself from the local client system. Although not meant to be limiting, limited use software of this type is widely available. At step 710, the servlet serves the encrypted handler file to the requesting client. At step 712, the servlet is extinguished to complete the transaction.

Returning now back to FIG. 6, a representative fulfillment dialog 600 is illustrated. This dialog identifies the handler and includes a number of tabs 602 that direct the user through a conventional subscription process. Thus, tab 602a requests personal information (e.g., user name, business address, e-mail address, employer, and other demographic information. Tab 602b, which is illustrated, describes the various use restrictions that are imposed on the handler and/or that may be selected by the user. As illustrated, the attachment is subject to a use restriction. In this example, which is merely representative, the user is asked to select a given use range (e.g., one-time, less than 5, 5–10, 11–25, etc.) for the attachment. By selecting the appropriate radio button, the user can identify the number of uses required. Different license fees may be charged, depending on the selection made. When the user has selected the appropriate condition, he or she selects OK and is navigated to the billing tab 602c. Upon entry of the appropriate billing information, the subscription is complete.

Of course, one of ordinary skill in the art will appreciate that the particular use limitations as set forth in the fulfillment dialog are not limited to a use count. Alternatively, the handler may be licensed for use for a given time period, or the handler may be licensed for a particular limited use (e.g., viewing but not editing, viewing but not full printing, etc.), or any combination of the above options. In this way, the fulfillment site can offer different types of license opportunities and charge appropriate prices for these licenses.

Thus, in an illustrative embodiment, it is assumed that a user has received an e-mail having an attachment. By way of example, assume the user receives an e-mail that includes a PowerPoint presentation. If the user's machine has the PowerPoint application locally, the user merely clicks the attachment, which action causes the PowerPoint application to start-up immediately if it is not already running.

If, however, the client machine does not support the needed handler (or the needed handler is supported locally but not otherwise available), the local e-mail client causes a browser routine to open up to a URL of the fulfillment site. Following a subscription dialog, the attachment handler is downloaded to the local client system for use.

While the present invention has been described and illustrated in the context of an Internet e-mail client, this is not a requirement of the invention. The inventive technique of embedding a fulfillment site URL into a file having an attachment may be used for any document type, and not just e-mail.

As noted above, in the illustrative embodiment, the inventive each of the routines is implemented as a Java application, an applet, native code, or code implemented within an existing application. More generally, preferably each of the processes described above is a set of instructions or code that together comprise a computer program. This program is executable in a processor running a given operating system. The set of instructions (program code) may be executed from a random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads or provides the file.

In an illustrative implementation, the attachment is provided at no cost for a limited number of usages. Once the number reaches a low threshold value, the fulfillment dialog is generated as described above.

Having thus described our invention, what we claim as new and desire to secure by Letters Patent is set forth in the following claims.

The invention claimed is:

1. A method of web-based delivery of a handler to handle an e-mail attachment, comprising:
   at a client, responsive to a selection of an e-mail attachment, automatically opening a browser to a given URL if the client is not capable of opening the attachment;
   serving a dialog to the client from the given URL;
   upon entry of given subscription information in the dialog, applying a given use restriction to a handler; and
   serving the handler to the client.

2. The method as described in claim 1 further including the step of:
   at the client, automatically installing the handler.

3. The method as described in claim 2 further including the step of:
   at the client, automatically uninstalling the handler upon a given occurrence.

4. The method as described in claim 3 wherein the given occurrence is invocation of the handler a given number of times as defined by the given use restriction.

5. The method as described in claim 3 wherein the given occurrence is a given passage of time as defined by the given use restriction.

6. The method as described in claim 1 wherein the given use restriction restricts a given function of the handler.

7. The method as described in claim 6 wherein the given function is an edit function.

8. The method as described in claim 6 wherein the given function is a print function.

9. The method as described in claim 1 wherein the step of applying a given use restriction applies an encrypted usage count to the handler.

10. The method as described in claim 1 wherein the given URL is associated with the e-mail attachment prior to delivery of the e-mail attachment to the client.

11. A method of web-based delivery of a handler to handle an e-mail attachment, comprising:
    serving a fulfillment dialog in response to a client request initiated upon selection of an e-mail attachment that cannot be processed at a local client system;
    upon entry of given billing and subscription information in the dialog, applying a given use restriction to a self-installing handler; and
    serving the handler to the local client system.

12. The method as described in claim 11 wherein, upon receipt at the local client system, the handler self-installs itself and processes the e-mail attachment.

13. The method as described in claim 11 wherein the step of applying a given use restriction associates a usage count to the handler.

14. The method as described in claim 13 wherein the usage count is encrypted to prevent alteration.

15. The method as described in claim 11 wherein the step of applying a given use restriction associates a time period during which the handler may be used to process the e-mail attachment.

16. The method as described in claim 11 wherein the step of applying a given use restriction restricts a given function of the handler.

17. A computer program product in a computer useable medium operative at a server, comprising:

means for serving a fulfillment dialog in response to a client request initiated upon selection of an e-mail attachment that cannot be processed at a local client system;

means responsive to entry of given information in the dialog for encrypting a self-installing handler with a given access count; and means for serving the self-installing handler to the local client system.

18. A server, comprising:

a handler;

means for serving a fulfillment dialog in response to a client request initiated upon selection of an e-mail attachment that cannot be processed at a local client system;

means responsive to entry of given information in the dialog for applying a given use restriction to the handler based on the information; and means for serving the handler to the local client system.

19. The server as described in claim 18 wherein the means for applying a given use restriction comprises means for encrypting the handler with an access count.

20. The server as described in claim 18 wherein the means for applying a given use restriction comprises means for restricting a given function of the handler.

21. The server as described in claim 18 wherein the means for applying a given use restriction comprises means for controlling the handler to uninstall itself from the local client system after a given time period has elapsed.

* * * * *